United States Patent
Ro et al.

[11] Patent Number: 6,115,498
[45] Date of Patent: Sep. 5, 2000

[54] CHARACTER IMAGE GENERATING APPARATUS AND METHOD THEREFOR

[75] Inventors: Seyong Ro, Sungnam; Keun Hwan Choi, Pyungtaek, both of Rep. of Korea

[73] Assignee: LG Electronics Inc., Seoul, Rep. of Korea

[21] Appl. No.: 09/061,029

[22] Filed: Apr. 16, 1998

[30] Foreign Application Priority Data

Apr. 17, 1997 [KR] Rep. of Korea ............... 97/14244

[51] Int. Cl.[7] ............... G06K 9/00; G06K 9/48; G09G 5/24
[52] U.S. Cl. ............... 382/200; 382/181; 382/199; 345/195; 345/471; 345/469
[58] Field of Search ............... 382/181, 199, 382/200, 232, 238; 345/195, 467, 471, 469

[56] References Cited

U.S. PATENT DOCUMENTS

| | | | |
|---|---|---|---|
| 4,373,156 | 2/1983 | Pfannkuch et al. | 345/151 |
| 4,459,586 | 7/1984 | McVey | 345/471 |
| 4,937,565 | 6/1990 | Suwannukul | 345/195 |
| 5,020,121 | 5/1991 | Rosenberg | 382/238 |
| 5,410,640 | 4/1995 | Morikawa et al. | 358/1.11 |
| 5,513,277 | 4/1996 | Huttenlocher | 382/200 |
| 5,630,028 | 5/1997 | DeMeo | 358/1.11 |
| 5,712,663 | 1/1998 | Matsumoto | 345/195 |
| 5,754,697 | 5/1998 | Fu et al. | 382/232 |
| 5,953,453 | 9/1999 | Fan et al. | 382/200 |
| 5,959,634 | 9/1999 | Yoshida | 345/467 |

*Primary Examiner*—Phuoc Tran
*Assistant Examiner*—Daniel G. Mariam
*Attorney, Agent, or Firm*—Finnegan, Henderson, Farabow, Garrett & Dunner, L.L.P.

[57] ABSTRACT

A character generating apparatus for generating a character image representing a character and a method therefor, which are capable of preventing a flicker phenomenon, which occurs in the television receiver, using a simple algorithm. In the present invention, an edge of the character is detected based on font data of the character, and a shadow property is determined from an attribute data of the character. A character image is generated by forming a shadow, having the shadow property, adjacent to the detected edge.

15 Claims, 5 Drawing Sheets

CHARACTER IMAGE GENERATING APPARATUS AND METHOD THEREFOR

BACKGROUND OF THE INVENTION

1. Field of the Invention

The present invention relates to a character display apparatus for an image processing apparatus which is directed to transforming a character signal of a sequential scanning method to a character signal of an interlaced scanning method and displaying the same, and in particular to an improved character display apparatus for an image processing apparatus and a method therefor which are capable of effectively decreasing a flickering phenomenon which occurs due to an interlaced scanning method.

2. Description of the Related Art

FIG. 1 is a block diagram illustrating a conventional image display apparatus. As shown therein, a modem 1 connected to a television receiver demodulates a communication protocol inputted through a network and outputs a character set data, and a video processing unit 3 generates a RGB signal of a sequential scanning method from the character set data using a character font data and a character data which are stored in a ROM 2. At this time, the video processing unit 3 processes the characters at a predetermined speed faster than when it is installed in an internet set top box.

In addition, an NTSC encoder 4 separates the RGB signal of a sequential scanning method from the video processing unit 3 into a chromaticity signal and a luminosity signal and outputs the thusly separated signal to the television monitor 5 for thus displaying a corresponding character on the screen.

The television receiver uses an interlaced scanning method which divides an image of one frame into two fields different from the sequential scanning method which is used for a computer monitor. At this time, each field is separated into an even number field and an odd number field, and the characters are alternately displayed on the even number lines and odd number lines.

Therefore, in the interlaced scanning method, the displayed characters are blinked, namely, a flicker phenomenon occurs. This flicker phenomenon is increased when the character is displayed on only one of either the even number line or the odd number line.

FIG. 2 is a view illustrating a conventional character processing apparatus which is capable of decreasing the above-described flicker phenomenon and includes a character image forming unit 10, a multiple value data transforming unit 11, an edge defocusing unit 12, a signal transforming unit 13 and a character display unit 14.

The operation of the conventional character processing apparatus will now be explained with reference to the accompanying drawing.

First, the character image forming unit 10 forms a binary image within the frame buffer based on a file data or a ROM data using an outline font register. In addition, the multiple value transforming unit 11 transforms the binary font image formed by the image forming unit 10 to a multiple value image including a gray scale by an antialiasing process.

Namely, the pixel which is shown in FIG. 3A is processed to become the pixels of FIG. 3B, and the pixels placed in the upper, lower, left and right sides are given written: ½ weights, and the pixels which are diagonally placed are given ¼ weight for thereby transforming the pixel image to a multiple value font image.

In addition, the edge defocusing unit 12 supplies the multiple value font images outputted from the multiple value data transforming unit 11 with a PSF (Point Spread Function) for thus defocusing the image within the frame buffer.

The multiple value font images which are font-registered as shown in FIG. 4A are filled with the outline vector font. At this time, as shown by "b" of FIG. 4B, angled corner edges are formed. Therefore, as shown in FIG. 4C, the images are sampled four times, and the character fonts are filled. Thereafter, the average values of the pixel density data are obtained, so that the portions which interface with the outline are formed to have an intermediate color tone.

The signal transforming unit 13 transforms the multiple value images placed within the frame buffer to the decoded and interlaced signal or the non-interlaced signal, and the character display unit 14 reproduces the output signal from the signal transforming unit 13 and displays on the monitor.

Therefore, in the conventional character processing apparatus, the images of the characters are defocused by the multiple data transforming unit 11 and the edge defocusing unit 12, so that the difference between the image of the even number field and the image of the odd number field is decreased for thereby decreasing a flicker phenomenon.

However, in the conventional character processing apparatus, it takes significant time for decreasing the flicker phenomenon due to the multiple value transforming process and edge defocusing process, so that a large data processing load is applied to the CPU compared to the OS processing capability of the internet set top box.

In addition, since it is impossible to use a predetermined number of memories in the internet set top box, high speed hardware is required, thus increasing the fabrication cost of the system.

SUMMARY OF THE INVENTION

The objects of the present invention are to overcome problems and disadvantages of the conventional device/method.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

One embodiment of the invention is a character processing apparatus for generating a character image representing a character having font data and attribute data, including an edge detector for detecting an edge of the character based on the font data; a shadow property determining unit for determining a property of a shadow based on the attribute data; and a character image generator for generating the shadow for the character based on the result of the edge detection, and for generating the character image based on the font data, the attribute data, the shadow and the property of the shadow.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
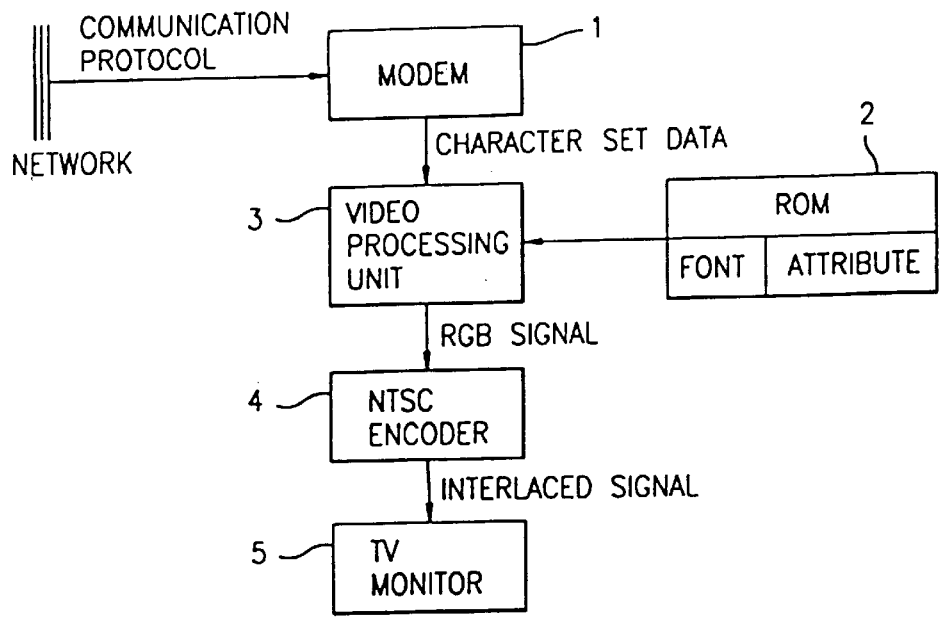
FIG. 1 is a block diagram illustrating a conventional image display apparatus.
Figure 2:
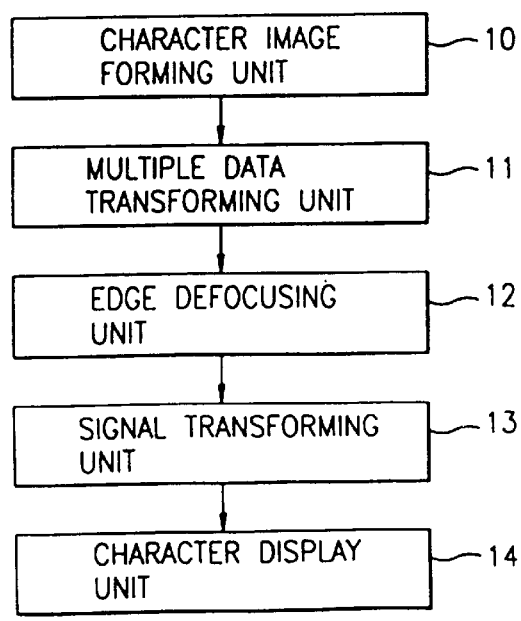
FIG. 2 is a block diagram illustrating a conventional character processing apparatus which is capable of decreasing a flicker phenomenon.
Figure 3A:
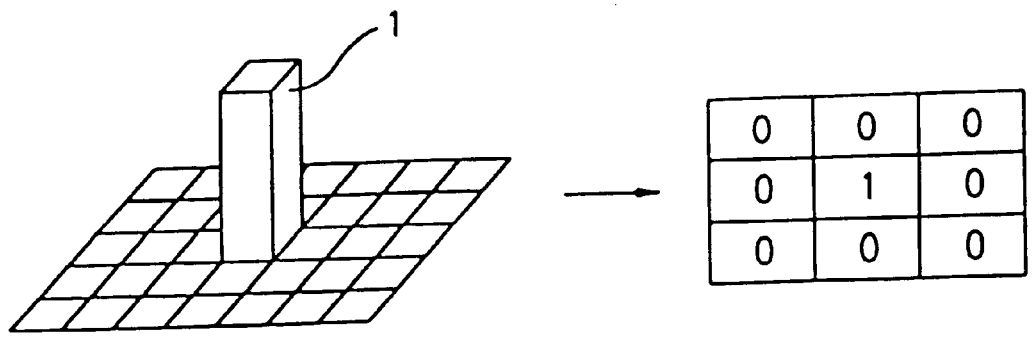
FIGS. 3A and 3B are views illustrating a method for transforming a binary font image to a multiple value font image of FIG. 2.
Figure 3B:
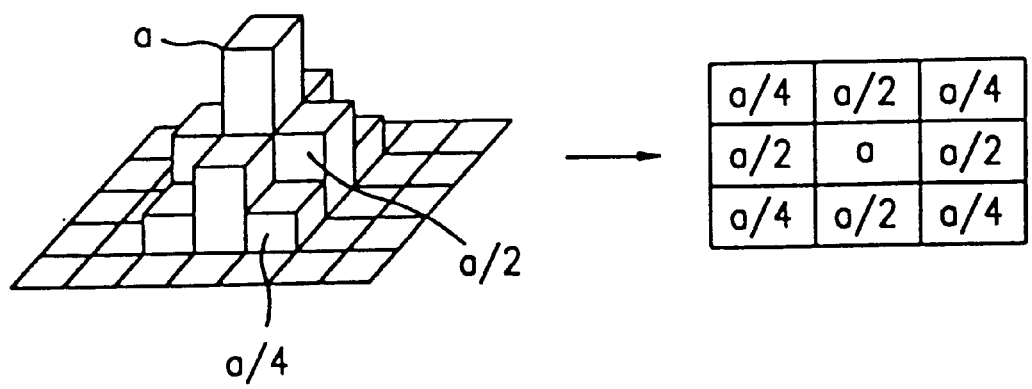
Figure 4A:
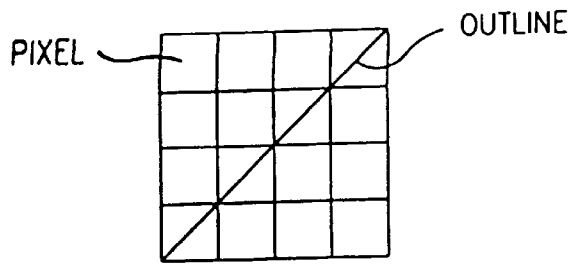
FIGS. 4A through 4D are views illustrating an edge defocusing process of FIG. 2.
Figure 4B:
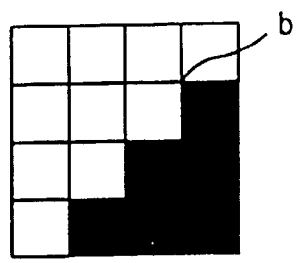
Figure 4C:
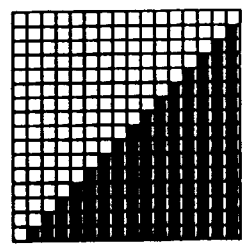
Figure 4D:
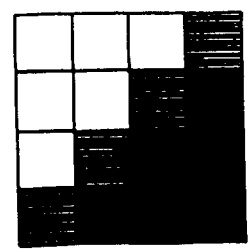
Figure 5:
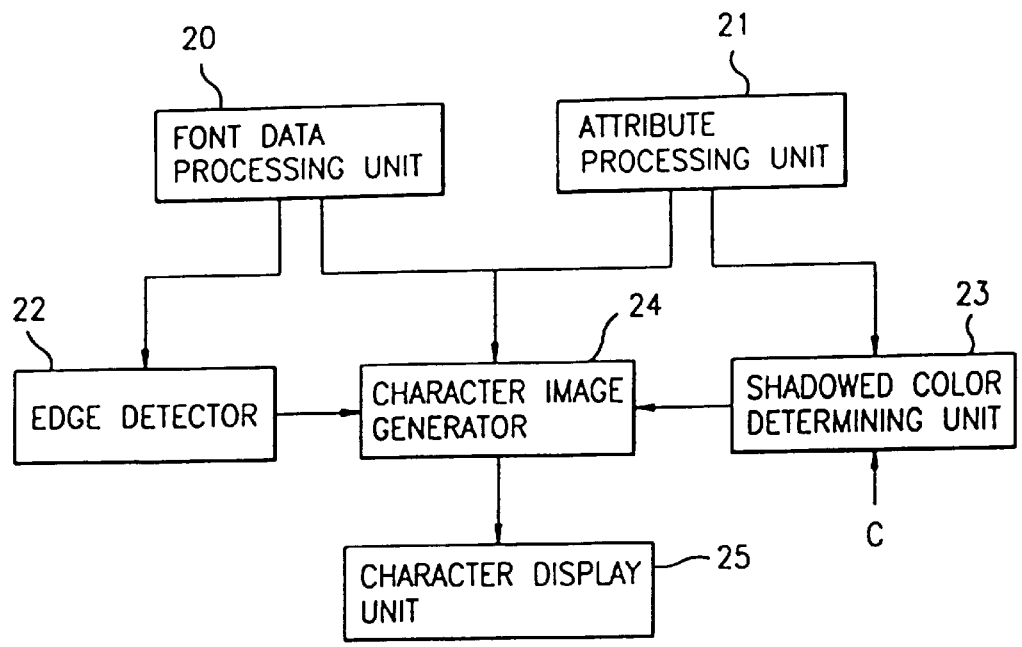
FIG. 5 is a block diagram illustrating a character display apparatus for an image processing apparatus according to the present invention.

FIG. 5 is a block diagram illustrating a character display apparatus for an image processing apparatus according to the present invention which includes a font data processing unit 20 for reading a font data of a character from a memory, an attribute data processing unit 21 for reading an attribute of each character such as a character color and a background color from the memory, an edge detector 22 for detecting an edge of a font data of each character outputted from the font data processing unit 20, a shadowed color determining unit 23 for computing the attribute data and determining the shadowed color, a character image generator 24 for combining the font data, attribute data, edge and shadowed color of each character and generating a character image, and a character display unit 25 for displaying the generated character image on a television receiver.

The operation of the character display apparatus according to the present invention will now be explained.

First, the font data processing unit 20 reads the font data of each character, in binary form, from the memory, and the attribute data processing unit 21 reads the attribute data of each character such as a character color and background color from the memory.

Figure 6:
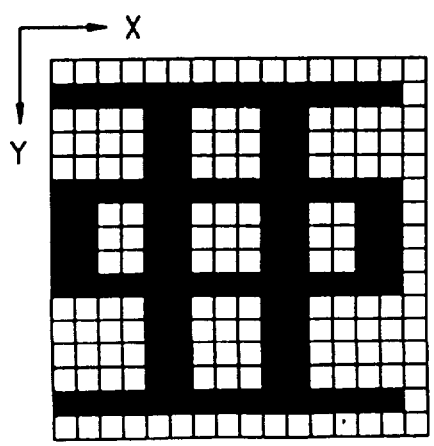
FIG. 6 is a view illustrating a binary font data of a character according to the present invention.
Figure 7:
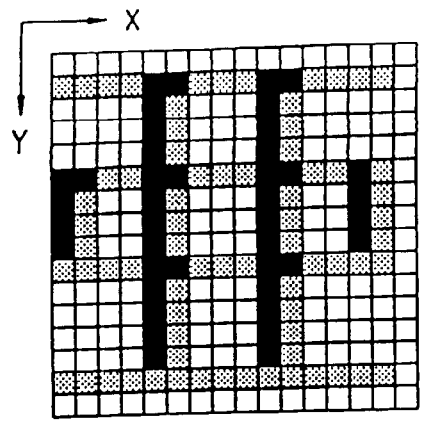
FIG. 7 is a view illustrating an edge detected by an edge detector of FIG. 5.

In addition, the edge detector 22 detects the font data of each character outputted from the font data processing unit 20, for example, the edge is detected by the following equation (1) from the binary font data of the character shown in FIG. 6. The edge detection result is shown in the lightly shaded pixels of FIG. 7. The character pixels which are not edges are shown in black.

$$\text{Edge}(x,y)=\text{Pixel}(x,y) \text{ AND } ((\text{Pixel}(x+1,y) \text{ XOR } \text{Pixel}(x,y)) \text{ OR } (\text{Pixel}(x,y+1) \text{ XOR } \text{Pixel}(x,y))) \quad (1)$$

At this time, the Pixel(x,y) is used for checking whether the current pixel corresponds with a predetermined font. Namely, the Pixel(x,y) is a binary value with respect to each pixel and has a true value (1) when it corresponds to the font portion in which the character color is filled, and has a false value (0) when it corresponds to the font portion in which the background color is filled. In addition, the Pixel(x+1,y) is used to check whether the pixel which is increased by 1 in the positive direction on the X-axis corresponds to a predetermined font, and the AND, OR and XOR are logic operators, and 1 denotes a true value, and 0 denotes a false value.

In addition, the XOR(Pixel(x+1,y), Pixel(x,y)) denote the logic operations for detecting any changes in the current pixel value [Pixel(x,y)] and the pixel value [Pixel(x+1,y)] which is increased by one (1) pixel on the X-axis. If the current pixel value is true, and the increased pixel value is false, the portion in which the character color is changed to the background color is detected as an edge portion.

The XOR(Pixel(x,y+1),Pixel(x,y)) is a logic operation for detecting any changes in the current pixel value [Pixel(x,y)] and the pixel value [Pixel(x,y+1)] which is increased by one (1) pixel on the Y-axis, and if the current pixel value is true, and the increased pixel value is false, the portion in which the character color is changed to the background color is detected as an edge portion.

Therefore, if the value of Edge(x,y) is true (1), the edge detector 22 detects the edge, and if the value of the same is false (0), the edge detector 22 does not detect the edge, so that it is possible to more quickly and easily detect the edge compared to the conventional art.

In addition, the shadowed color determining unit 23 receives the character constant (C) selected by a user and the attribute data (character color and background color) of each character from the attribute data processing unit 21 and determines the shadowed color of each character based on Equation (2).

$$R_s = CR_f + (1-C)R_b$$

$$G_s = CG_f + (1-C)G_b$$

$$B_s = CB_f + (1-C)B_b, \text{ where } 0 \leq C \leq 1 \quad (2)$$

The RGB denotes Red, Green and Blue, and subscript s denotes a shadowed color, f denotes a font color, and b denotes a background color.

Since the character constant (C) is a value inputted by a user, when the value C is increased, the color becomes similar to the color of the font, and if the value C is decreased the color becomes similar to the background color. Therefore, the value C is changed in accordance with the brightness of the current screen for thereby determining the shadowed color. In order to increase the operation speed, the value C is determined to have an intermediate color between the character color and the background color.

Therefore, in the present invention, the shadowed color is determined as an intermediate color between the character color and the background color, and the shadowed color is filled into the pixels adjacent to the edge for thus generating a character image, so that it is possible to prevent a flicker phenomenon by reducing the difference between the even number field and the odd number field. In addition, an after-image effect and optical illusion effect are obtained with respect to the character color, so that it is possible to prevent a flicker phenomenon.

Figure 8:
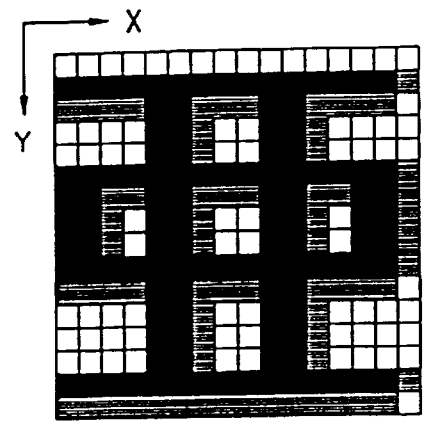
FIG. 8 is a view illustrating a character which is shadow-processed and displayed on a television screen of FIG. 5.

The character image generator 24 combines the character font data, character attribute data, edge and shadowed color outputted from the font data processing unit 20, the attribute data processing unit 21, the edge detector 22 and the shadowed a color determining unit 23 and generates a character image by inserting the shadowed color into the pixel adjacent to the edge, and the thusly generated character image is displayed on the television receiver through the character display unit 24 as shown in FIG. 8.

Figure 9:
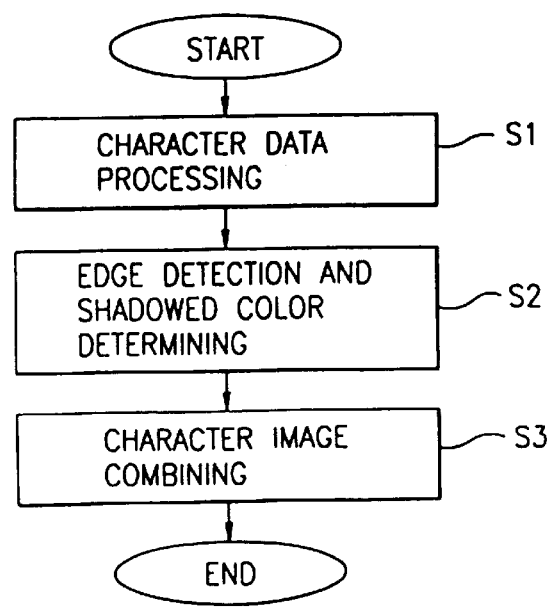
FIG. 9 is a flow chart illustrating a character display method for an image processing apparatus according to the present invention.

FIG. 9 illustrates a character display method according to the present invention which includes the steps of a character data processing step S1 for reading a font data and an attribute data (character color and background color) with respect to each character data, an edge detection and shadowed color determining step S2 for computing detecting the edge of the font data, computing an attribute data and determining the shadowed color, and a character image combining step S3 for generating a character image from the font data, the attribute data, the edge and shadowed color.

As described above, in the character data processing step S1, the font data processing unit 20 and the attribute data processing unit 21 read the font data and attribute data (character color and background color) of each character from the memory.

In addition, in the edge detection and shadowed color determining step S2, the edge detector 22 detects any changes with respect to the current pixel value from the font data of each character in the pixel values increased by one (1) pixel in the direction of the X-axis or Y-axis, so that the portion in which the character color is changed to the background color is detected. In addition, the shadowed color determining unit 23 determines the shadowed color from the character constant (CP selected by a user and the attribute data (character color and background color) of each character.

Finally, in the character image combining step S3, the character image generator 24 combines the character font data, the character attribute data, the edged and shadowed color outputted from the font data processing unit 20, the attribute data processing unit 21, the edge detector 22 and the shadowed color determining unit 23 and generates a character image by inserting the shadowed color into the pixel which is adjacent to the edge, and the thusly generated character image is displayed on the television receiver through the character display unit 24.

As described above, in the present invention, it is possible to increase a character image processing speed and decrease a flickering phenomenon by adapting the apparatus of the present invention to the display apparatus which uses an interlaced scanning method in the television receiver and a terminal of a computer communication which outputs a character image.

In the present invention, the edge is detected from the font data of each character by a simple algorithm, and a character image is generated by inserting a shadowed color into the pixel adjacent to the detected edge for thus decreasing the flicker phenomenon.

In addition, in the present invention, the edge and shadowed color are determined by a simple algorithm, so that the memory is minimized, and the load of the CPU of the internet set top box is minimized, whereby it is possible to prevent a flicker phenomenon.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A character processing apparatus for generating a character image representing a character having font data and attribute data, comprising: an edge detector for detecting an edge of the character based on the font data, said edge of the character being determined whether or not there is a change in value of the font data between a current pixel and an adjacent pixel in an X direction or between the current pixel and another adjacent pixel in a Y direction perpendicular to the X direction;

a shadow property determining unit for determining a property of a shadow based on the attribute data; and a character image generator for generating the shadow for the character based on the result of the edge detection, and for generating a character image based on the font data the attribute data, the shadow and the property of the shadow.

2. The apparatus of claim 1, where the attribute data includes a color of the character and a background color.

3. The apparatus of claim 1, further comprising a character display unit for displaying the character image.

4. The apparatus of claim 2, wherein said property of the shadow includes an intermediate color between the character color and the background color.

5. A character processing apparatus for generating a character image representing a character having font data and attribute data, comprising:

an edge detector for detecting an edge of the character that is determined whether or not there is a change in value of the font data between a current pixel and an adjacent pixel in an X direction or between the current pixel and another adjacent pixel in a Y direction perpendicular to the X direction; and a character image generator for generating the character image based on the font data, attribute data and the result of the detection by the edge detector.

6. A character processing apparatus for generating a character image representing a character, comprising:

a font data processing unit for providing a font data of a character;

an attribute data processing unit for providing an attribute data of the character;

an edge detector for detecting an edge of the character based on the font data, said edge of the character being determined whether or not there is a change in value of the font data of the character between a current pixel and an adjacent pixel in an X direction or between the current pixel and another adjacent pixel in a Y direction perpendicular to said X direction, and determines the current pixel as an edge based on a result of said edge detector;

a shadow property determining unit for determining a property of a shadow based on the attribute data; and a character image generator for generating a character image by forming a shadow having said shadow property adjacent to the edge of the character.

7. The apparatus of claim 6, wherein said property of the shadow includes an intermediate color between a color of the character and a color of its background.

8. A method for generating a character image representing a character comprising:

providing font data and attribute data for a character;

detecting an edge of the character based on the font data, said edge of the character being determined whether or not there is a change in value of the font data of the character between a current pixel and an adjacent pixel in an X direction or between the current pixel and another adjacent pixel in a Y direction perpendicular to the X direction;

determining a property of a shadow based on the attribute data;

forming a shadow having said shadow property adjacent to the detected edge; and generating a character image based on said font data, said attribute data and said formed shadow.

9. The method of claim 8, wherein said shadow property includes a color of the shadow.

10. A method for generating a character image representing a character, comprising:

providing font data of a character;

providing a color of the character and a color of its background;

detecting an edge of the character based on the font data, said edge of the character being determined whether or not there is a change in value of the font data of the character between a current pixel and an adjacent pixel in an X direction or between the current pixel and another adjacent pixel in a Y direction perpendicular to the X direction;

determining a color of a shadow for the character based on the character color and the background color; and forming a shadow, having said determined shadow color, adjacent to the detected edge to generate a character image.

11. The method of claim 10, further comprising displaying the generated character image.

12. The method of claim 10, wherein said shadow color includes an average color between the character color and the background color.

13. The method of claim 10, wherein said detecting an edge includes detecting the presence or absence of said edge based on the following equation:

$$\text{Edge}(x,y) = \text{Pixel}(x,y) \text{ AND } ((\text{Pixel}(x+1,y) \text{ XOR } \text{Pixel}(x,y)) \text{ OR } (\text{Pixel}(x,y+1) \text{ XOR } \text{Pixel}(x,y)))$$

where

Edge (x, y) refers to whether or not Pixel(x,y) is an edge pixel;

Pixel (x, y) refers to a value of a character pixel at location (x,y);

Pixel (x+1, y) refers to a value of a pixel at location (x+1,y); and

Pixel (x, y+1) refers to a value of a pixel at location (x,y+1).

14. The method of claim 13, wherein said detecting an edge includes detecting the presence of the edge when the value of Edge(x,y) is true (1), and the absence of the edge when the value of Edge(x,y) is false (0).

15. The method of claim 10, wherein said determining a shadow color includes determining the shadow color based on the following equation:

$$R_s = CR_f + (1-C)R_b$$

$$G_s = CG_f + (1-C)G_b$$

$$B_s = CB_f + (1-C)B_b$$

where $0 \leq C \leq 1$ and

R, G, and B denote Red, Green and Blue, respectively; subscript s denotes a shadow color; subscript f denotes the character color; and subscript b denotes the background color.

* * * * *